Sept. 25, 1962  D. L. WATSON ETAL  3,055,206
APPARATUS FOR MEASURING CHANGES IN WEIGHT OF
SAMPLES AS A FUNCTION OF TEMPERATURE
Filed Aug. 14, 1958  2 Sheets-Sheet 2
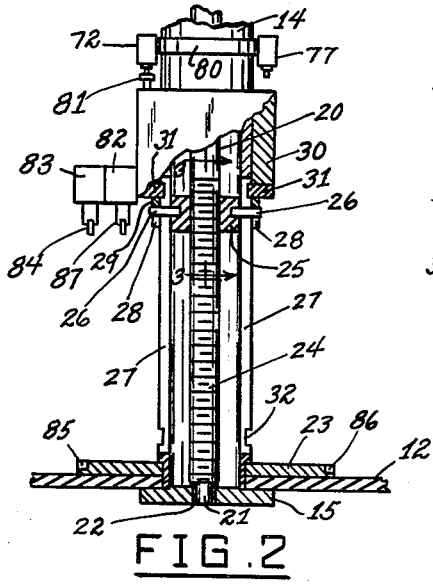
INVENTORS
DONALD L. WATSON
JOSEPH L. TYRRELL
BY Herman L. Gordon
ATTORNEY United States Patent Office 3,055,206
Patented Sept. 25, 1962

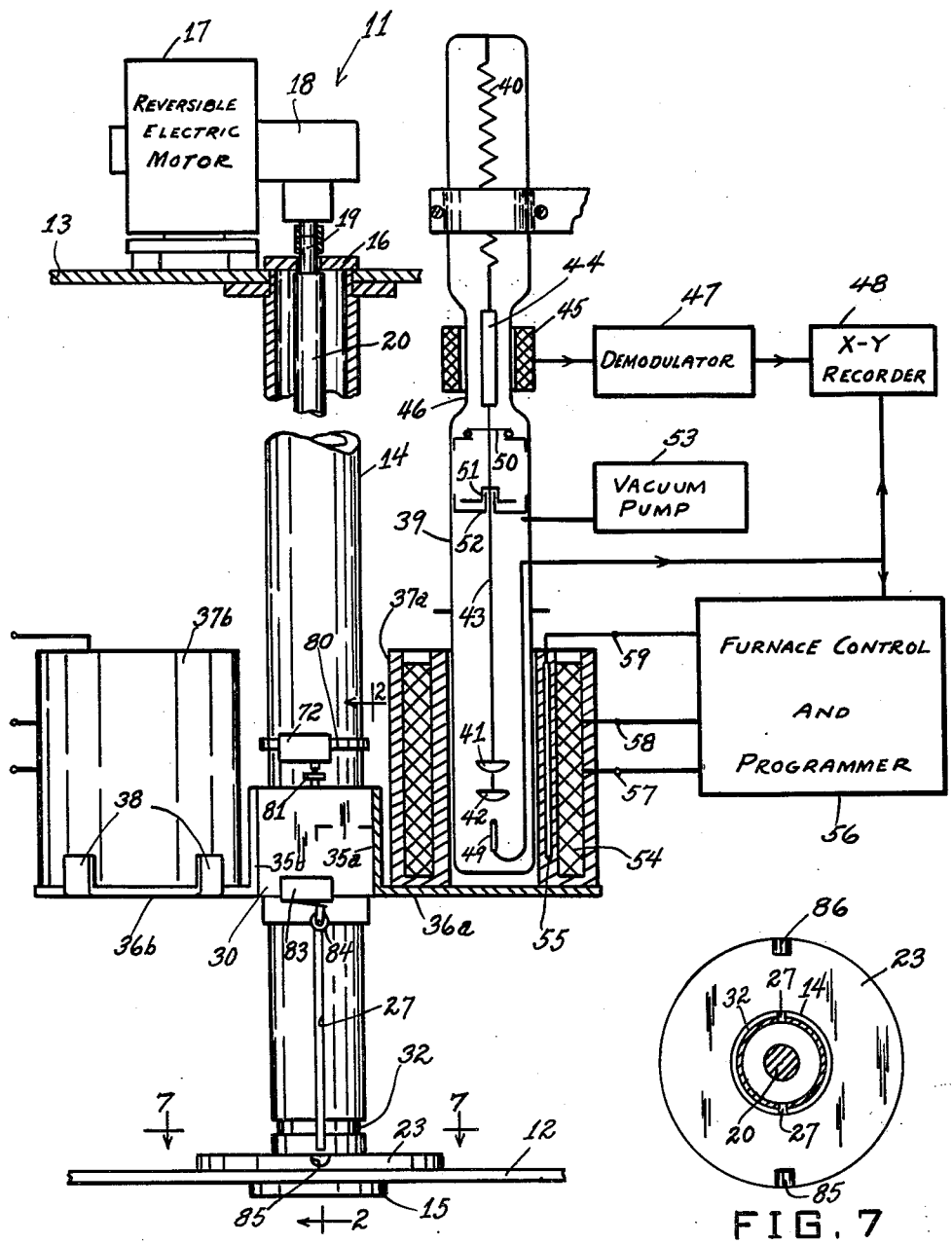

3,055,206
APPARATUS FOR MEASURING CHANGES IN WEIGHT OF SAMPLES AS A FUNCTION OF TEMPERATURE
Donald L. Watson, Bethesda, and Joseph L. Tyrrell, Riverdale, Md., assignors to American Instrument Co., Inc., Silver Spring, Md.
Filed Aug. 14, 1958, Ser. No. 754,987
16 Claims. (Cl. 73—15)

This invention relates to apparatus for measuring changes in the weight of samples due to temperature changes thereof, and more particularly to an interchangeable furnace arrangement for such apparatus.

A main object of the invention is to provide an improved apparatus for measuring changes in weight of samples due to temperature changes thereof, said apparatus being simple in construction, being arranged so that consecutive determinations of changes in weight of samples may be accomplished without delay due to cooling of the associated furnace means, and providing a reliable means for accurately measuring changes in weight of samples as a function of temperature.

A further object of the invention is to provide an improved apparatus for measuring and recording changes in weight of samples due to change in temperature thereof, said apparatus being provided with multiple heating ovens and with means for readily substituting one oven for another in the system whenever required, whereby consecutive determinations may be made without the delay involved in allowing an oven to cool down to a specified starting temperature.

A still further object of the invention is to provide an improved interchangeable furnace arrangement for an apparatus for measuring and recording changes in weight of samples due to increase or other change in temperature thereof, said arrangement being especially useful in making consecutive determinations of the change in weight with temperature of samples in studies such as corrosion of metals, thermal decomposition of inorganic and organic compounds, solid-state reactions, roasting and calcination of minerals, thermochemical reactions of ceramics and ceramic-coated metals, pyrolysis of coal, petroleum and wood, determination of moisture, volatiles and ash, absorption, adsorption, and desorption properties of materials, rates of evaporation (drying curves), and sublimation, latent heats, thermal degradation of natural and synthetic polymers, and the like.

Further objects and advantages of the invention will become apparent from the following description and claims and from the accompanying drawings wherein:

FIGURE 1 is an elevational view, partly in vertical cross-section of an interchangeable oven arrangement according to the present invention and diagrammatically illustrating the associated elements of the apparatus for measuring changes in weight of samples, of which the interchangeable oven arrangement forms a part.

FIGURE 2 is a vertical cross-sectional view taken on line 2—2 of FIGURE 1.

FIGURE 3 is an enlarged cross-sectional view, partly in elevation, taken on line 3—3 of FIGURE 2.

FIGURE 4 is a horizontal cross-sectional view taken on line 4—4 of FIGURE 3.

FIGURE 5 is a vertical cross-sectional view, with parts broken away, taken on line 5—5 of FIGURE 4.

FIGURE 6 is a horizontal cross-sectional view taken on line 6—6 of FIGURE 3.

FIGURE 7 is a horizontal cross-sectional view taken on line 7—7 of FIGURE 1.

FIGURE 8 is a schematic wiring diagram showing the electrical connections associated with the oven changing motor and heater control relays for the ovens in an apparatus according to this invention.

A prime purpose of the present invention is to provide an instrument for measuring and automatically recording changes in weight of a sample (1) as a function of temperature, programmed for a selected heating rate, and (2) changes in weight as a function of time at a selected constant temperature.

The instrument consists primarily of a highly precise spring balance enclosed in a glass chamber for operation at controlled temperatures under vacuum or in gaseous atmospheres, at, or below ambient pressure, a pair of interchangeable furnaces, and a linear transducer arranged to convert spring deflections, proportional to sample weight, into electrical signals. These signals, together with those corresponding to sample temperature or time are applied to the inputs of an X—Y recorder, which traces a Cartesian coordinate graph depicting their relationship.

The pair of interchangeable furnaces allow consecutive determinations to be made without delay, since a cool furnace may be rapidly substituted for the heated furnace of the last determination, allowing the new determination to proceed immediately.

Referring to the drawings, the furnace-supporting assembly is designated generally at 11, and comprises a horizontal base plate 12 and a horizontal top plate 13, forming part of the framework of the apparatus. Secured between the top plate 13 and the base plate 12 is a vertical tubular, cylindrical column member 14 provided with the bottom cap 15 and the centrally apertured top cap 16. A reversible electric motor 17 is mounted on the top plate 13, and is drivingly coupled, through a suitable gear reduction unit 18 to the reduced top end 19 of a vertical shaft 20 rotatably mounted axially in the tubular column 14. Said shaft has a reduced bottom end portion 21 which is journalled in a bearing bushing 22 mounted centrally in the bottom cap 15.

A relatively large annular disc 23 is secured on base plate 12 around the lower portion of tubular column 14. The shaft 20 is formed with screw threads 24 which threadedly engage with a nut member 25 slidably disposed in the lower portion of column 14, said nut member being provided with a pair of diametrically opposed outwardly projecting radial pins 26, 26 which extend through opposed vertical slots 27, 27 formed in the lower portion of column 14, preventing rotation of the nut member and causing said nut member to be moved axially in the column responsive to rotation of shaft 20. Said pins 26, 26 supportingly engage in respective diametrically opposed vertical notches 28, 28 formed in the bottom edge of a collar member 29 slidably mounted on the tubular column 14.

Designated at 30 is a generally rectangular block member slidably and rotatably engaged on the column 14 and supported on the collar 29. At its lower portion said block member is provided with inwardly projecting diametrically opposed elements 31, 31 slidably engaging in the slots 27, 27 and preventing rotation of the block member when it is in an elevated position, for example, as shown in FIGURE 2. The column member 14 is formed with an annular groove 32 at its lower portion registrable with and adapted to receive said lug elements 31, 31 when the collar member 29 is lowered into engagement with the disc member 23, allowing the block member 30 to be rotated at this time, as will be presently described.

A depending pin member 33 secured in the bottom of block member 30 engages in a substantially semi-circular guide groove 34 formed in the top edge of collar member 29, as shown in FIGURES 3 and 4, guiding the block member for rotation through an angle of 180° relative to the collar member when it is in its lowered position.

Rigidly secured to opposite sides of the block member 30 are respective supporting brackets 35a, 35b having outwardly extending horizontal plate-like portions 36a, 36b adapted to support respective annular, generally cylindrical electric oven members 37a, 37b, said oven members being received in respective enclosures defined on said plate-like portions 36a and 36b by spaced upstanding retaining lugs 38 provided on the edges of said plate-like portions.

Designated at 39 is a vertical elongated glass sample chamber which is suitably mounted by means not shown in a position such that its lower portion will be received in one of the oven members 37a or 37b in the elevated position of block member 30, as shown in FIGURE 1.

As will be presently described, the block member 30 may be lowered to a position wherein the lugs 31, 31 may enter the groove 32, the descent of the block member being sufficient to allow the sample chamber 39 to be completely withdrawn from said one oven member. The block member and brackets 35a, 35b may then be rotated 180 degrees to bring the other oven member into vertical alignment with the stationary sample chamber 39, after which, with a new sample of material placed in the sample chamber, the other oven member may be elevated to the position of FIGURE 1, allowing another determination to be made while the first oven member is cooling down.

The sample chamber 39 includes a suspension spring 40 to which are attached the sample crucible 41 and the tare crucible 42 by means of a supporting cable element 43 and the transducer armature 44. The armature 44 is supported coaxially in the transducer coil 45 which is mounted on a reduced portion 46 of the sample chamber and which is connected in a conventional manner through a demodulater 47 to one of the input stages (weight) of an X—Y recorder 48. The sample thermocouple 49 is connected to the other (temperature) input stage of the X—Y recorder 48.

The cable element 43 is provided with suitable weight-calibrating means 50 and with damping sleeve means 51 coacting with cooperating sleeve means 52 mounted in the sample chamber to prevent undesired transient oscillations of the supporting cable 43.

Sample chamber 39 may be connected to a vacuum pump 53 for evacuating the interior of the chamber.

Each oven member 37a and 37b is provided with a heating winding 54 and with a controlling thermocouple 55 which may be connected to a suitable controllable energizing source and programming device 56 at respective terminals 57, 58 and 59 as shown diagrammatically in FIGURE 1.

While FIGURE 1 shows a diagrammatic arrangement wherein the respective furnaces 37a and 37b may be manually connected in turn to the energizing and programming device 56, FIGURE 8 illustrates a circuit arrangement wherein respective individual control relays 60a and 60b are employed to control the energization of said furnaces. Suitable circuitry, not shown, is provided, connecting the respective furnace windings to a source of current through the contacts of the relays 60a and 60b, whereby said furnaces will be respectively energized responsive to the energization of the associated control relays 60a and 60b.

The relays 60a and 60b may be either manually controlled or may be controlled automatically, in accordance with the positions of the respective furnaces, namely, in accordance with the condition of the furnace-positioning mechanism illustrated in FIGURES 1 to 7.

Thus, respective manually operated, three-position switches 61a and 61b are provided, said switches having lower contacts 62a and 62b selectively engageable by the poles of said switches. The lower contacts 62a and 62b are connected to one line conductor 64. The switch poles are connected through the respective relay windings to the remaining line conductor 65. Upper contact 63a is connected by a wire 66 to one pole 67a of a two-pole main control relay 68. The associated stationary contact 69a of relay 68 is connected by a wire 70 to one stationary contact 71 of a two-position limit switch 72 having a pole 73 and having an additional stationary contact 74. Upper contact 63b is connected by a wire 75 to the other pole 67b of relay 68. The associated stationary contact 69b is connected by a wire 115 to one stationary contact 76 of a two-position limit switch 77 having a pole 78 and having an additional stationary contact 79. Stationary contact 74 is connected to pole 78 by a wire 80.

As shown in FIGURE 2, the respective limit switches 72 and 77 are secured to diametrically opposite portions of a supporting collar 80' mounted on column member 14 just above the upper limiting position of block member 30. An upstanding abutment member 81 on said block member is respectively engageable with the depending operating plungers of said limit switches in the two uppermost positions of said block member. Thus, in the position illustrated in FIGURES 1 and 2, the abutment member 81 engages the operating plunger of switch 72 and causes its pole 73 to engage contact 71, as shown in FIGURE 8. When the operating plunger of switch 72 is released, pole 73 engages contact 74.

Similarly, when abutment member 81 engages the depending operating plunger of switch 77, pole 78 engages contact 76. In the released position of said switch 77, pole 78 engages contact 79, as shown in FIGURE 8.

Mounted on one side of block member 30 are the additional limit switches 82 and 83, the outer switch 83 having a depending operating element 84 which is engageable in one or the other of two recesses 85 and 86 formed in diametrically opposite peripheral portions of bottom disc member 23 when the block member 30 is in its lowermost position and when one or the other of the furnaces 37b or 37a is in vertical registry with the chamber 39. The other limit switch 82 has a depending operating element 87 engageable with disc 23, to disengage its pole 88 from its stationary contact 89 when the block member 30 is in said lowermost position.

The pole 90 of switch 83 engages its associated contact 91 in all positions of the block member 30 except when the block member is rotated, in its lowermost position, to cause the switch-operating element 84 to engage on the top surface of disc 23. Switch 83 remains closed when element 84 engages in either of the recesses 85 or 86.

Switch pole 90 of limit switch 83 is connected by a wire 92 to the line wire 64. Switch poles 73 and 88 are connected together by a wire 93, which is also connected to contact 91 of limit switch 83. Contact 71 of limit switch 72 is connected by a wire 94 to relay contact 69a.

Designated generally at 95 is a three-pole, three-position, manually operated switch having the respective ganged poles 96, 97 and 98. When actuated to the right, as viewed in FIGURE 8, namely, in the "down" direction, said poles are engageable with respective stationary contacts 99, 100 and 101. When actuated to the left, as viewed in FIGURE 8, namely, in the "up" direction, said poles are engageable with respective stationary contacts 102, 103 and 104.

Contacts 99 and 100 are connected by a wire 105 to the contact 89 of limit switch 82. Contacts 101 and 102 are connected by a wire 106 to the line wire 65. Contacts 103 and 104 are connected by a wire 107 to the contact 79 of limit switch 77.

The reversible motor 17 has the respective windings 108 and 109, the winding 108 being employed as the reversing winding. Thus, one terminal of winding 109 is connected to line wire 65 and the other terminal thereof is connected to pole 97, so that winding 109 will be energized in the same manner when pole 97 engages either contact 100 or 103. The terminals of winding 108 are connected to the respective switch poles 96 and 98, so that the line connections of said winding will be reversed, depending upon whether the poles of switch 95 are actuated either to the right or to the left, as viewed in FIGURE 8.

FIGURE 8 illustrates the circuit arrangement which exists when the parts are in the positions illustrated in FIGURE 1, namely, when block member 30 is in its elevated position with the test chamber 39 received in furnace 37a. Under these conditions, if the switches 61a and 61b are set in their "automatic" positions, namely, with their poles engaging their upper contacts 63a and 63b, furnace control relay 69a may be energized by closing the control switch 110 of main control relay 68 by a circuit comprising line wire 65, the winding of relay 60a, the pole of switch 61a, contact 63a, wire 66, pole 67a, contact 69a, wire 94, contact 71, pole 73, wire 93, contact 91, pole 90, wire 92, and line wire 64.

To change furnaces, switch 95 is first operated to the right, as viewed in FIGURE 8, namely, to its "down" position. This energizes motor winding 109 by a circuit comprising line wire 65, winding 109, pole 97, contact 100, wire 105, contact 89, pole 88, wire 93, contact 91, pole 90, wire 92, and line wire 64. At the same time, motor winding 108 is energized by a circuit comprising line wire 65, wire 106, contact 101, pole 98, winding 108, pole 96, contact 99, wire 105, contact 89, pole 88, wire 93, contact 91, pole 90, wire 92, and line wire 64.

The motor rotates screw shaft 20 in a direction to lower nut member 25, releasing limit switch 72 and causing pole 73 to disengage from contact 71 and engage contact 74. This deenergizes the furnace control relay 60a and prepares a circuit, presently to be described, for energizing control relay 60b.

Block member 30 descends until limit switch 82 is opened by the engagement of its operating element 87 with disc member 23, whereby both motor windings 108 and 109 are disconnected from line wire 64 by the opening of limit switch 82.

Block member 30 may then be manually rotated through an angle of 180 degrees, during which switch 83 is opened, as above described by the engagement of element 84 with the top surface of disc member 23, whereby neither motor winding nor the heater control relay 60a or 60b can be energized (with switches 61a and 61b remaining set in their "automatic" positions) during said rotation.

When furnace 37b comes into vertical alignment with chamber 39, element 84 enters recess 86, allowing switch 83 to close. Switch 82 remains open.

Block member 30 may then be elevated by actuating switch 95 to the left, as viewed in FIGURE 8, namely, to its "up" position. This energizes motor winding 109 through a circuit comprising line wire 65, winding 109, pole 97, contact 103, wire 107, contact 79, pole 78, wire 80, contact 74, pole 73, wire 93, contact 91, pole 90, wire 92 and line wire 64. Motor winding 108 is energized by a circuit comprising line wire 65, wire 106, contact 102, pole 96, winding 108, pole 98, contact 104, wire 107, contact 79, pole 78, wire 80, contact 74, pole 73, wire 93, contact 91, pole 90, wire 92 and line wire 64.

Screw shaft 20 is rotated by the motor in a direction to elevate nut member 25, and such rotation continues until abutment member 81 engages the operating element of limit switch 77, causing pole 78 to disengage from contact 79 and engage contact 76. This deenergizes both motor windings and energizes furnace relay 60b by a circuit comprising line wire 65, the winding of relay 60b, the pole of switch 61b, contact 63b, wire 75, pole 67b, contact 69b, wire 115, contact 76, pole 78, wire 80, contact 74, pole 73, wire 93, contact 91, pole 90, wire 92, and line wire 64.

Thus, furnace 37b is substituted for furnace 37a, so that a succeeding determination can be made without the necessity of waiting until furnace 37a has cooled down.

For a further succeeding determination, furnace 37a may be later substituted for furnace 37b by actuating switch 95 to the "down" position, manually rotating the block member 30 back through an angle of 180 degrees when it is in its lowered position, and by then actuating switch 95 to its "up" position, thus restoring the parts to their positions shown in FIGURES 1 and 8.

As shown in FIGURE 8, the furnace control relays 60a and 60b are provided with respective indicating pilot lamps 116a and 116b, connected in parallel therewith, to indicate which furnace is in operation.

While a specific embodiment of an apparatus for measuring changes in the weight of samples due to temperature changes thereof has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an apparatus for detecting changes in weight of a sample as a function of temperature, a vertical support, a test chamber adjacent said support, weight responsive means mounted in said test chamber and adapted to receive a sample, means responsive to said weight-responsive means for measuring and indicating the weight of said sample, a test furnace slidably mounted on said support and guided solely for vertical movement thereon, said furnace being located to receive said test chamber at certain positions of the furnace on said support, whereby the test chamber may be heated and the change in weight of a sample on said weight-responsive means may be measured, an electric motor, elevating and lowering means on the support operatively connected to said test furnace, means drivingly coupling said motor to said elevating and lowering means, an energizing circuit connected to said motor, and cooperating means on the furnace and the support constructed and arranged to open said energizing circuit responsive to the movement of said test furnace to a predetermined position on said support.

2. In an apparatus for detecting changes in weight of a sample as a function of temperature, a vertical support, a test chamber adjacent said support, weight responsive means mounted in said test chamber and adapted to receive a sample, means responsive to said weight-responsive means for measuring and indicating the weight of said sample, a test furnace slidably mounted on said support and guided solely for vertical movement thereon, said furnace being located to receive said test chamber in an elevated position of the furnace on said support, whereby the test chamber may be heated and the change in weight of a sample on said weight-responsive means may be measured, an electric motor, elevating and lowering means operatively connected to said test furnace, means drivingly coupling said motor to said elevating and lowering means, an energizing circuit connected to said motor, and cooperating means on the furnace and the support constructed and arranged to open said energizing circuit responsive to the downward movement of said test furnace to a position below the bottom end of said test chamber.

3. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace slidably and rotatably mounted on said support and guided solely for vertical movement thereon, said furnace being located to receive said test chamber in an elevated position of the furnace on said support, whereby the test chamber may be heated and the change in weight of a sample on said weight-responsive means may be measured, means limiting rotation of said test furnace while in said elevated position, an electric motor, elevating and lowering means operatively connected to said test furnace, means drivingly coupling said motor to said elevating and lowering means, an energizing circuit connected to said motor, and cooperating means on the furnace and the support constructed and arranged to open said energizing circuit responsive to the lowering of said test furnace to a position below the bottom end of said test chamber.

4. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace slidably and rotatably mounted on said support and guided solely for vertical movement thereon, said furnace being located to receive said test chamber in an elevated position of the furnace on said support, whereby the test chamber may be heated and the change in weight of a sample on said weight-responsive means may be measured, means limiting rotation of said test furnace while it is in an elevated position receiving any portion of said test chamber, an electric motor, elevating and lowering means operatively connected to said test furnace, means drivingly coupling said motor to said elevating and lowering means, an energizing circuit connected to said motor, and cooperating means on the furnace and the support constructed and arranged to open said energizing circuit responsive to the lowering of said test furnace to a position wherein the test furnace no longer receives any portion of said test chamber.

5. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace rotatably and slidably mounted on said support and guided solely for vertical movement thereon, said furnace being located to receive said test chamber when the furnace is elevated in a predetermined rotated position relative to said support, whereby the test chamber may be heated and the change in weight of a sample on said weight-responsive means may be measured, an electric motor, elevating and lowering means operatively connected to said test furnace, means drivingly coupling said motor to said elevating and lowering means, an energizing circuit connected to said motor, means closing said energizing circuit when said test furnace is in said predetermined rotated position, and cooperating means on the furnace and the support constructed and arranged to open said energizing circuit responsive to the elevation of said furnace in said predetermined rotated position to a predetermined height on said support.

6. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace rotatably and slidably mounted on said support and guided solely for vertical movement thereon, said furnace being located to receive said test chamber when the furnace is elevated in a predetermined rotated position relative to said support, whereby the test chamber may be heated and the change in weight of a sample on said weight-responsive means may be measured, an electric motor, elevating and lowering means operatively connected to said test furnace, means drivingly coupling said motor to said elevating and lowering means, an energizing circuit connected to said motor, means closing said energizing circuit when said test furnace is in said predetermined rotated position, means limiting rotation of said test furnace when it is elevated in said predetermined rotated position, and cooperating means on the furnace and the support constructed and arranged to open said energizing circuit responsive to the elevation of said furnace to a predetermined height on said support.

7. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace rotatably and slidably mounted on said support and guided solely for vertical movement thereon, said furnace being located to receive said test chamber when the furnace is elevated in a predetermined rotated position relative to said support, whereby the test chamber may be heated and the change in weight of a sample on said weight-responsive means may be measured, an electric motor, elevating and lowering means operatively connected to said test furnace, means drivingly coupling said motor to said elevating and lowering means, an energizing circuit connected to said motor, means preventing closure of said energizing circuit unless said test chamber is in said predetermined rotated position, means limiting rotation of said test furnace when it is elevated in said predetermined rotated position, and cooperating means on the furnace and the support constructed and arranged to open said energizing circuit responsive to the elevation of said furnace to a predetermined height on said support.

8. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace slidably mounted on said support and guided solely thereby for vertical movement thereon, said test furnace being movable to a position receiving said test chamber, whereby the test chamber may be heated and the change in weight of a sample on said weight-responsive means may be measured, a reversible electric motor, elevating and lowering means on the support operatively connected to said test furnace, means drivingly coupling said motor to said elevating and lowering means, first energizing circuit means connected to said motor and being constructed and arranged to energize said motor at times in a direction to lower said test furnace, cooperating means on the furnace and support constructed and arranged to open said first energizing circuit means responsive to the lowering of said furnace to a position below the bottom end of said test chamber, second energizing circuit means connected to said motor and being constructed and arranged to energize said motor at other times in a direction to elevate said test furnace, and cooperating means on the furnace and support constructed and arranged to open said second energizing circuit means responsive to the elevation of said furnace to a predetermined height on said support.

9. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace slidably mounted on said support and guided solely thereby for vertical movement thereon, weight-responsive means mounted in said test chamber and adapted to receive a sample, a reversible electric motor, elevating and lowering means on the support operatively connected to said test furnace, means drivingly coupling said motor to said elevating and lowering means first energizing circuit means connected to said motor and being constructed and arranged to energize said motor at times in a direction to lower said test furnace, cooperating means on the furnace and support constructed and arranged to open said first energizing circuit means responsive to the lowering of said furnace to a position below the bottom end of said test chamber, second energizing circuit means connected to said motor and being constructed and arranged to energize said motor at other times in a direction to elevate said test furnace, cooperating means on the furnace and support constructed and arranged to open said second energizing circuit means responsive to the elevation of said furnace to a predetermined height on said support, and means limiting rotation of said test furnace while it is in an elevated position receiving any portion of said test chamber.

10. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, bracket means rotatably and slidably mounted on said support and guided solely thereby for vertical movement thereon, a pair of test furnaces mounted on said bracket means at the same horizontal distance from said vertical support as said test chamber and being rotatable with said bracket means to selectively receive said test chamber when the bracket means is elevated on the support, whereby the test chamber may be heated and the change in weight of a sample on said weight-responsive means may be measured, and means limiting rotation of said bracket means while any portion of said test chamber is received in one of the test furnaces.

11. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, bracket means rotatably and slidably mounted on said support and guided solely thereby for vertical movement thereon, a pair of test furnaces mounted on said bracket means at the same distance from said vertical support in a horizontal direction as said test chamber and being rotatable with said bracket means to selectively receive said test chamber when the bracket means is elevated on the support, whereby the test chamber may be heated and the change in weight of a sample on said weight-responsive means may be measured, means to elevate said bracket means, and means limiting elevation of said bracket means unless one of said test furnaces is disposed below said test chamber substantially in vertically alignment therewith.

12. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace slidably mounted on said support and guided solely for vertical movement thereon, said furnace being located to receive said test chamber at a predetermined position on said support, whereby the test chamber may be heated and the change in weight of a sample on said weight-responsive means may be measured, an electric motor, elevating and lowering means operatively connected to said test furnace, means drivingly coupling said motor to said elevating and lowering means, an energizing circuit connected to said motor, cooperating means on the furnace and support constructed and arranged to open said energizing circuit responsive to the movement of said test furnace to said predetermined position, means to control the energization of said test furnace, and means rendering said last-named means inoperative unless said test furnace is in said predetermined position.

13. In an apparatus for detecting changes in weight of a sample as a function of temperature, a vertical support, a test chamber adjacent said support, weight-responsive means mounted in said test chamber and adapted to receive a sample, means responsive to said weight-responsive means for measuring and indicating the weight of said sample, a test furnace slidably mounted on said support and guided solely thereby for vertical movement thereon, said furnace being located to receive said test chamber when the furnace is at a predetermined position on said support, whereby the test chamber may be heated and the change in weight of a sample on said weight-responsive means may be measured, means to control the energization of said test furnace, and means rendering said last-named means inoperative unless said test furnace is in said predetermined position.

14. In a test apparatus of the character described, a vertical support, a test chamber adjacent said support, weight-responsive means mounted in said test chamber and adapted to receive a sample, means responsive to said weight-responsive means for measuring and indicating the weight of said sample, bracket means rotatably and slidably mounted on said support and guided solely thereby for vertical movement thereon, and a plurality of test furnaces mounted on said bracket means at the same horizontal distance from said vertical support as said test chamber and being rotatable with said bracket means to selectively receive said test chamber when the bracket means is elevated on the support, whereby the test chamber may be heated and the change in weight of a sample on said weight-responsive means may be measured.

15. In a test apparatus of the character described, a vertical support, a test chamber adjacent said support, bracket means rotatably and slidably mounted on said support and guided solely thereby for vertical movement thereon, weight-responsive means mounted in said test chamber and adapted to receive a sample, means responsive to said weight-responsive means for measuring and indicating the weight of said sample, a plurality of test furnaces mounted on said bracket means at the same horizontal distance from said vertical support as said test chamber and being rotatable with said bracket means to selectively receive said test chamber when the bracket means is elevated on the support, whereby said test chamber may be heated and a change in a sample in said test chamber may be measured, and means limiting rotation of said bracket means while any portion of said test chamber is received in one of the test furnaces.

16. The structure of claim 15, and electrically operated elevating means drivingly coupled to said bracket means, and means preventing energization of said elevating means unless one of said test furnaces is disposed below and in vertical alignment with said test chamber.

References Cited in the file of this patent
UNITED STATES PATENTS

| 1,558,828 | Brace | Oct. 27, 1925 |
| 2,709,914 | Brabender et al. | June 7, 1955 |